US009841776B1

(12) United States Patent
Bari et al.

(10) Patent No.: US 9,841,776 B1
(45) Date of Patent: Dec. 12, 2017

(54) METHODS AND APPARATUS TO IMPROVE TRANSIENT PERFORMANCE IN MULTIPHASE VOLTAGE REGULATORS

(71) Applicant: Texas Instruments Incorporated, Dallas, TX (US)

(72) Inventors: Syed Mustafa Khelat Bari, Blacksburg, VA (US); Kuang-Yao Cheng, Warwick, RI (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/257,610

(22) Filed: Sep. 6, 2016

(51) Int. Cl.
*G05F 1/575* (2006.01)
*H02M 3/156* (2006.01)
*G05F 1/56* (2006.01)

(52) U.S. Cl.
CPC .................................... *G05F 1/56* (2013.01)

(58) Field of Classification Search
CPC ............ G05F 1/462; G05F 1/56; G05F 1/575; H02M 3/156; H02M 3/158; H02M 3/1588; H02M 3/155; H02M 3/145; H02M 2001/007
USPC ....... 323/265, 266, 268, 273, 280, 282, 283, 323/351
See application file for complete search history.

(56) References Cited

U.S. PATENT DOCUMENTS 7,764,054 B1 * 7/2010 Guo ...................... H02M 3/156 323/224
8,018,208 B1 * 9/2011 Kahn .................... H02M 3/156 323/224
8,400,778 B2 * 3/2013 Hsing ...................... H01R 9/00 250/551
9,490,702 B1 * 11/2016 Zhak ..................... H02M 3/158
2006/0001408 A1 * 1/2006 Southwell ........... H02M 3/1584 323/282
2011/0267019 A1 * 11/2011 Krishnamurthy ... H02M 3/1584 323/283
2013/0057240 A1 * 3/2013 Zambetti ............. H02M 3/1584 323/271
2015/0113294 A1 * 4/2015 Zhang ................... H02M 3/158 713/300
2015/0280556 A1 * 10/2015 Bari ...................... H02M 3/156 323/282
2016/0301303 A1 * 10/2016 Bari ...................... H02M 3/156

* cited by examiner

*Primary Examiner* — Adolf Berhane
(74) *Attorney, Agent, or Firm* — William B. Kempler; Charles A. Brill; Frank D. Cimino

(57) ABSTRACT

Methods and apparatus to improve a transient response of a multi-phase voltage regulator are disclosed. An example apparatus includes a differential amplifier to compare a first voltage to a droop voltage, the first voltage corresponding to a sum of inductor currents in the multi-phase voltage regulator, the droop voltage corresponding to an output voltage of the multi-phase voltage regulator; and output a first control voltage based on the comparison; a differentiator to compute a derivative of the droop voltage and adjust a ramp voltage with the derivative of the droop voltage to generate a second control voltage; and a comparator to compare a reference voltage with a second voltage, the second voltage being a combination of the first control voltage and the second control voltage; and when the second voltage is greater than the reference voltage, output a voltage pulse.

20 Claims, 11 Drawing Sheets

METHODS AND APPARATUS TO IMPROVE TRANSIENT PERFORMANCE IN MULTIPHASE VOLTAGE REGULATORS

FIELD OF THE DISCLOSURE

This disclosure relates generally to voltage regulators and, more particularly, to methods and apparatus for improving transient performance in multiphase voltage regulators.

BACKGROUND

A voltage regulator is a circuit that is used in various devices to maintain a constant voltage level. Some voltage regulators include a capacitor and an inductor driven by switches to maintain the desired constant voltage. A multiphase regulator may use multiple phases of capacitor and inductor pairs to maintain the desired voltage. Multiphase voltage regulators are more efficient than single-phase voltage regulators in high current applications. Constant "on-time" control may be used to control the operation of the voltage regulator. In some examples, a ramp voltage is used in such a constant "on-time" control to reduce jitter (e.g., deviation from desired voltage regulator output) of the output of the voltage regulator.

SUMMARY

Examples disclosed herein improve a transient response of a multi-phase voltage regulator using a variable ramp modulator. An example modulator includes a differential amplifier to compare a first voltage to a droop voltage, the first voltage corresponding to a sum of inductor currents in the multi-phase voltage regulator, the droop voltage corresponding to an output voltage of the multi-phase voltage regulator, and output a first control voltage based on the comparison. Such an example modulator further includes a differentiator to compute a derivative of the droop voltage and adjust a ramp voltage with the derivative of the droop voltage to generate a second control voltage. Such an example modulator further includes a comparator to compare a reference voltage with a second voltage, the second voltage being a combination of the first control voltage and the second control voltage, and when the second voltage is greater than the reference voltage, output a voltage pulse.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
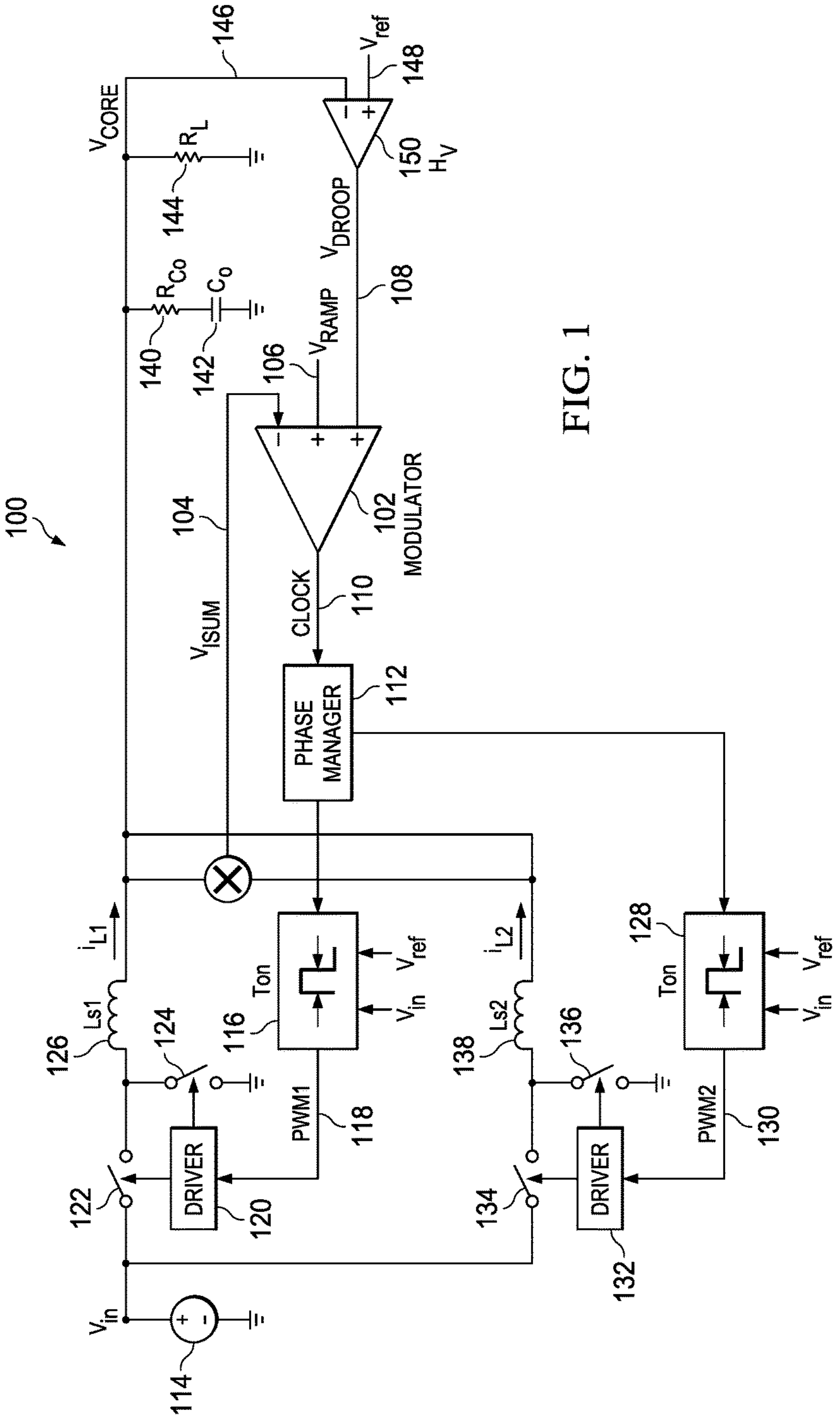
FIG. 1 is an illustration of an example multiphase voltage regulator with an example modulator for improving the transient response of the example multiphase voltage regulator.

Constant on-time current mode (COTCM) control is used in voltage regulating applications due to its high light load efficiency, higher bandwidth design capability, and faster transient response than a fixed frequency peak current mode control. The transient response is associated with the amount of time and/or variation of the output voltage of a voltage regulator in response to a transient event (e.g., changes in the load of the voltage regulator). In some examples, COTCM control in a multiphase voltage regulator utilizes a pulse distribution method via a modulator. The modulator compares a voltage (e.g., a summed current voltage) corresponding to a sum of the inductor currents from the multiple phases to an output voltage of the voltage regulator to trigger a duty cycle triggering pulse (e.g., a clock pulse). A phase manager is used to distribute the clock pulses to one of the multiple phases to operate the voltage regulator at the selected phase.

Pulse distribution methods are highly sensitive to noise. As the duty cycle and/or number of phases of a voltage regulator increase, a number of ripple cancellation points increases. A ripple cancellation point is a point at which the summed current is zero (e.g., the point at which transition between phases of the voltage regulator is desirable). Noise in the system can adjust the ripple cancellation point causing unwanted jitter in the voltage regulator. A ramp voltage may be applied to the modulator coupled to the voltage regulator to improve noise performance by reducing the unwanted jitter. The larger the ramp, the more the unwanted jitter is reduced. Conventional techniques of reducing jitter include utilizing a fixed ramp voltage. However, such a conventional fixed ramp voltage increases the steady state difference between the summed current voltage and a droop voltage of the voltage regulator. The droop voltage is the loss of the output voltage of the COTCM control circuit drives a load. The increased difference makes it difficult for the modulator to saturate the duty cycle quickly (e.g., to increase the duty cycle) at load step-up (e.g., transient state), causing an unwanted undershoot of the output voltage (e.g., causing poor performance). The larger the conventional fixed ramp, the larger the undershoot of the output voltage. This is problematic because it is desirable to increase the duty cycle at load step-up to quickly respond to the change in load without the undershoot of the output voltage. Additionally, as the size of such a conventional fixed ramp increases, the bandwidth decreases slowing down the response of the voltage regulator. Examples disclosed herein include a modulator that improves transient performance in multi-phase power converters while minimizing the undershoot of the output voltage of the COTCM control.

Examples disclosed herein increase the slope of a ramp voltage applied to a modulator momentarily at a transient state (e.g., during load changes) using the derivative of the droop voltage to improve transient performance. The duty cycle of the clock pulses depends on a difference between (A) the ramp voltage and (B) the difference the between the droop voltage and the summed current voltage (e.g., from currents corresponding to multiple phases of the voltage regulator). For example, as the difference between the droop voltage and the summed inductor currents decrease, the duty cycle of the clock pulses increases. Additionally, as the slope of the ramp voltage increases, the duty cycle of the clock pulses increases. In some examples disclosed herein, the slope of the ramp voltage is increased at transient state to increase the duty cycle. In some examples disclosed herein, the droop voltage is increased at the transient state to decrease the difference between the droop voltage and the summed current voltage to increase the duty cycle. Examples disclosed herein increase the slope of the ramp voltage and/or the droop voltage by taking a derivative of the droop voltage and combining (e.g., adding) the derivate with the droop ramp and/or droop voltage. Because the droop voltage quickly increases at transient state, the derivative of the droop voltage provides enough voltage to increase the ramp voltage and/or droop voltage to quickly (e.g., substantially faster than conventional techniques) increase the duty cycle (e.g., cause saturation within the modulator) thereby increasing the transient performance of the voltage regulator with significantly less undershoot than conventional techniques.

The illustration of FIG. 1 illustrates a COTCM control in a two-phase voltage regulator 100. Alternatively, the example voltage regulator 100 may include any number of phases. The example voltage regulator 100 includes an example modulator 102, example summed current voltage (Visum) 104, an example voltage ramp (Vramp) 106, an example voltage droop (Vdroop) 108, an example clock 110, an example phase manager 112, an example input voltage (Vin) 114. The first phase of the voltage regulator 100 includes an example time on circuit (Ton) 116, a first example pulse width modulation (PWM) signal 118, an example driver 120, example switches 122, 124, and a first example inductor 126. The second phase of the example voltage regulator 100 includes an example Ton circuit 128, a second example PWM signal 130, an example driver 132, example switches 134, 136, and a second example inductor 138. The example voltage regulator 100 further includes an example output resistor (Rco) 140, an example output capacitor (Co) 142, an example load resistance (R1) 144, an example core voltage (Vcore) 146, an example reference voltage (Vref) 148, and an example differential amplifier 150.

The example modulator 102 of FIG. 1 compares the example Visum 104, the example Vramp 106, and the example Vdroop 108 to output the example clock 110. The example modulator 102 computes the derivative of the example Vdroop 108. In some examples, as further described in conjunction with FIG. 2, the derivative of the example Vdroop 108 is combined with Vramp 106 to increase the duty cycle of the example clock 110. In some examples, as further described in conjunction with FIG. 4, the derivative of the example Vdroop 108 (e.g., dVdroop/dt) is combined with Vdroop 108 to increase the duty cycle of the example clock 110.

The example phase manager 112 of FIG. 1 is a circuit that receives the pulses (e.g., voltage pulses) of the example clock 110 and outputs the pulses to the first phase and/or second phase of the voltage regulator 100. In some examples, the phase manager 112 alternates clock pulses between the first phase and the second phase. In some examples, the phase manager 112 is controlled by a controller and outputs the pulses to the first phase and/or second phase based on instructions from the controller.

The example Ton circuit 116 of FIG. 1 produces a fixed "on" time (e.g., a voltage pulse of a predetermined length) to the gate of the example driver 120 based on the clock pulses output by the phase manager 112. The output of the example Ton circuit 116 is the example first PWM signal 118. The example driver 120 controls the example switches 122, 124 based on the example first PWM signal 118 to control voltage/current corresponding to the first inductor 126 at the first phase. For example, when the example switch 122 is closed and the example switch 124 is open, the example Vin 114 provides voltage/charge to the first phase. When the example switch 122 is open and the example switch 124 is closed, the charge in the first phase is discharged to ground. The example Ton circuit 128 produces a fixed "on" time to the gate of the example driver 132 based on the clock pulses output by the phase manager 112. The output of the example Ton circuit 128 is the example second PWM signal 130. The example driver 132 controls the example switches 134, 136 based on the example second PWM signal 130 to control voltage/current corresponding to the second inductor 138 at the second phase. For example, when the example switch 134 is closed and the example switch 136 is open, the example Vin 114 provides voltage/charge to the first phase. When the example switch 134 is open and the example switch 136 is closed, the charge in the first phase is discharged to ground.

A first current through the first example inductor 126 of FIG. 1 and a second current through the second example inductor 138 are combined. The example Visum 104 is a voltage representative of the combined first and second currents. Additionally, the voltage generated by the first and second example inductors 126, 138 is represented by the example Vcore 146. The example Vcore 146 is the output voltage of the example voltage regulator 100. The example Vcore 146 is dissipated through the example Rco 140 and Co 142 and may change based on the example R1 144. The example differential amplifier 150 compares (e.g., subtracts) the example Vcore 146 with the example Vref 148 to generate the example Vdroop 108. The example Vdroop 108 is equivalent to a difference between Vref 148 and Vcore 146. In some examples, the differential amplifier 150 amplifies the difference.

Figure 2:
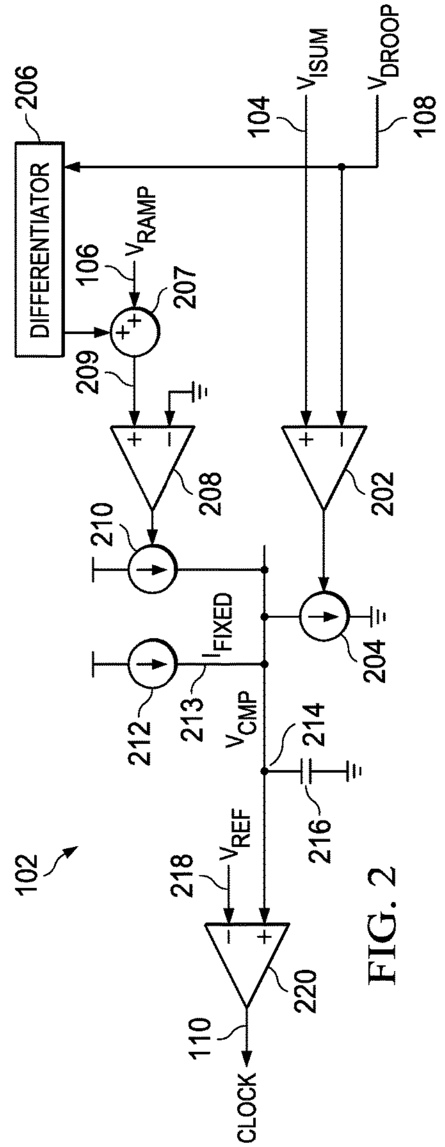
FIG. 2 is a block diagram of the example modulator of FIG. 1.

FIG. 2 is a block diagram of an example implementation of the modulator 102 of FIG. 1, disclosed herein, to improve the transient response of the example voltage regulator 100 of FIG. 1 by increasing the slope of the example Vramp 106 during transient state. While the example modulator 102 is described in conjunction with the example voltage regulator 100 of FIG. 1, the example modulator 102 may be utilized to improve the transient response of any type of voltage regulator. The example modulator 102 includes the example Visum 104, the example Vramp 106, the example Vdroop 108, and the example clock 110 of FIG. 1. The example modulator 102 further includes an example differential amplifier 202, an example differential amplifier output current source 204, an example differentiator 206, an example summer 207, an example amplifier 208, and an example adjusted Vramp 209, an example ramp current source 210, an example fixed (Ifixed) current source 212, an example Ifixed current 213, an example comparator nodal voltage (Vcmp) 214, an example capacitor 216, an example reference voltage (Vref) 218, and an example comparator 220.

The example differential amplifier 202 of FIG. 2 compares the example Visum 104 and the example Vdroop 108 by amplifying the difference between the Visum 104 and the Vdroop 108. The output of the example differential amplifier 202 is used as a control voltage to control the example differential amplifier output current source 204 to generate a current (e.g., a differential amplifier output current) toward ground when the differential amplifier voltage is positive (e.g., the difference between Visum 104 and Vdroop 108 is positive) and toward the example Vcmp 214 when the differential amplifier voltage is negative (e.g. the difference between Visum 104 and Vdroop 108 is negative).

The example differentiator 206 of FIG. 2 computes a derivative of the example Vdroop 108. The example differentiator 206 outputs dVdroop/dt (e.g. the derivative of the Vdroop) to the example summer 207. The example summer 207 combines (e.g., adds) dVdroop/dt to Vramp 106 to output the example adjusted Vramp 209, increasing the rate of increase (e.g., slope) of the example Vramp 106, when dVdroop/dt is not zero. As described above, Vdroop is the loss of the output voltage of the example voltage regulator 100 (FIG. 1) based on a load (e.g., represented by the example Rl 144). At transient state, the slope of Vdroop will quickly increase. Thus, the example differentiator 206 adds a significant boost to the Vramp 106 at transient state increasing the slope of the example Vramp 106 via the example adjusted Vramp 209.

The example amplifier 208 of FIG. 2 compares the example adjusted Vramp 209 to a ground voltage to amplify the example adjusted Vramp 209. The output of the example amplifier 208 is a control voltage that controls the example ramp current source 210 to generate a current (e.g., ramp current) toward the Vcmp 214. Additionally, the example Ifixed current source 212 also generates the example Ifixed 213 toward the example Vcmp 214. The combination of the example Ifixed current 213, the example ramp current, and the example differential amplifier output current generates the example Vcmp 214. Accordingly, Vcmp 214 increases when the adjusted Vramp 209 increases and/or the difference between Visum 104 and Vdroop 108 decreases. The voltage of Vcmp 214 is stored in the example capacitor 216 and discharged periodically or aperiodically at every pulse of the example clock 110.

The example comparator 220 of FIG. 2 compares the example Vcmp 214 to the example Vref 218. When the example Vref 218 is larger than the example Vcmp 214, the comparator 220 outputs zero volts. When the example Vref 218 is smaller than the example Vcmp 214, the example comparator 220 outputs a pulse and the charge stored in the example capacitor 216 is discharged. In some examples, the Vramp 106 is controlled by the clock 110. In such examples, the Vramp 106 is discharged when the clock 110 pulses, decreasing the voltage on Vcmp 214. The faster that the example Vcmp 214 can recover to a voltage above the Vref 218, the faster the clock 110 will pulse creating a faster duty signal.

When the example modulator 102 of FIG. 2 is operating at steady state (e.g., not at a transient state), the example Vdroop 108 will be substantially steady. Thus, dVdroop/dt will be zero and the modulator 102 will maintain a steady state duty cycle. As further described in conjunction with FIG. 3, steady state ripples (e.g., unintentional change in Vdroop 108) are blocked by the example differentiator 206. When the example modulator 102 is not operating at steady state (e.g., during power switch on-time, power switch off-time, when switching phases, etc.), the example Vdroop 108 will increase quickly, causing the differentiator 206 to increase the slope of the example Vramp 106 by adding dVdroop/dt to the example Vramp 106 to generate the example adjusted Vramp 209 via the example summer 207. Increasing the slope of the example adjusted Vramp 209 increases the slope of Vcmp 214 to cause Vcmp 214 to more quickly reach Vref 218. Because Vcmp 214 rises more quickly to reach Vcmp 214, the output clock 110 pulses faster. As described above, when the clock 110 pulses the voltage on the example Vcmp 214 is discharged, and the process repeats. Thus, the example modulator 102 increases the duty cycle to quickly respond the transient transition and prevent undershoot.

Figure 3:
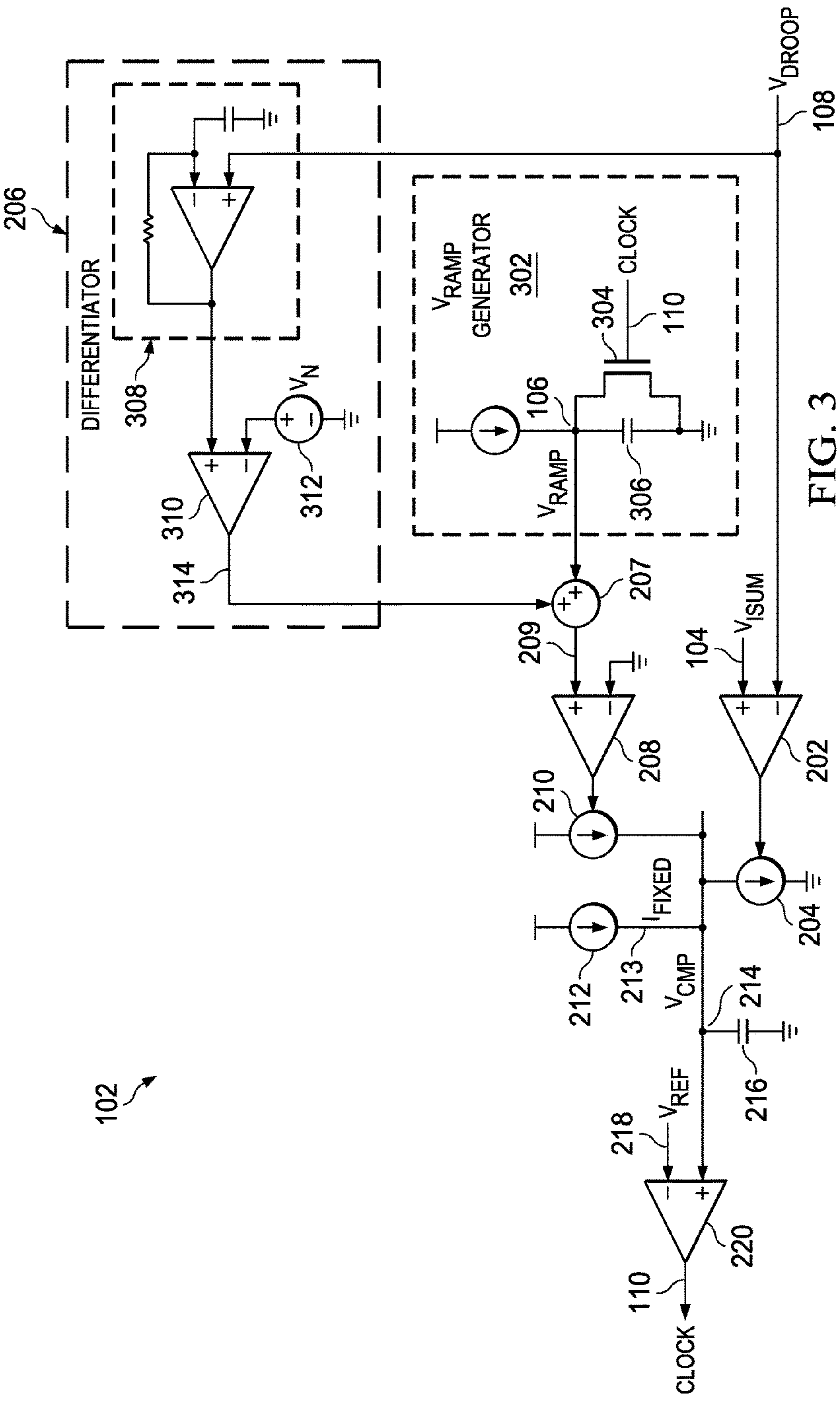
FIG. 3 is a block diagram of the example modulator of FIG. 1 including a hardware implementation of an example ramp generator and an example differentiator and of FIG. 2.

FIG. 3 is a block diagram of an example implementation of the example modulator 102 of FIG. 1 with a hardware implementation of the example differentiator 206 of FIG. 2 and a hardware implementation of an example Vramp generator 302. While the example modulator 102 is described in conjunction with the example voltage regulator 100 of FIG. 1, the example modulator 102 may be utilized to improve the transient response of any type of voltage regulator. The example modulator 102 includes the example Visum 104, the example Vramp 106, the example Vdroop 108, and the example clock 110 of FIG. 1. The example modulator 102 further includes the example differential amplifier 202, the example differential amplifier output current source 204, the example differentiator 206, the example summer 207, the example amplifier 208, the example adjusted Vramp 209, the example ramp current source 210, the example Ifixed current source 212, the example Ifixed 213, the example Vcmp 214, the example capacitor 216, the example Vref 218, and the example comparator 220. The example Vramp generator 302 includes an example transistor 304, and an example capacitor 306. The example differentiator 206 includes an example differentiator amplifier 308, an example an example voltage (Vn) 312, an example amplifier 310, and an example amplifier output voltage 314 (e.g. dVdroop/dt).

The example Vramp generator 302 of FIG. 3 is a circuit that outputs the example Vramp 106. The example Vramp generator 302 includes a voltage source to charge the example capacitor 306 when the example transistor 304 is off (e.g., when the example clock 110 is a low voltage). As the example capacitor 306 charges, the example Vramp 106 increases in a linear manner to generate the ramp voltage signal. As described above in conjunction with FIG. 2, when the Vcmp 214 raises to a voltage above the example Vref 218, the example clock 110 pulses high. When the example clock 110 pulses high, pulse is applied to the gate of the example transistor 304 to enable (e.g., turn on) the example transistor 304 which discharges the example capacitor 306 causing both the example Vramp 106 and the example Vcmp 214 to quickly decrease. After the pulse of the example clock 110 ceases, the voltage source charges the example capacitor 306 repeating the process. Although the example Vramp generator 302 is illustrated and described as shown in FIG. 3, any alternative circuit may be utilized to output a ramp voltage waveform.

The example differentiator 206 of FIG. 3 is a circuit used to increase the slope of the example Vramp 106 by taking a derivative of the example Vdroop 108. The example differentiator 206 includes an example differentiator amplifier 308. The example differentiator amplifier 308 receives the example Vdroop 108 and produces a voltage directly proportional the rate of change of the example Vdroop 108 with respect to time. When Vdroop 108 is steady (e.g., during steady state), the output of the example differentiator amplifier 308 will be zero volts. When Vdroop 108 increases (e.g., at transient state), the output of the example differentiator amplifier 308 will be a voltage representing the rate of increase (e.g., slope) of Vdroop 108 (e.g., dVdroop/dt). Alternatively, the example differentiator amplifier 208 may be replaced with any kind of high pass filter and/or bandpass filter to produce the voltage directly proportional to the rate of change of the example Vdroop 108 with respect to time. The example differentiator 206 further includes the example amplifier 310 which compares the output of the differentiator amplifier 308 to the example Vn 312 to block any potential dVdroop/dt associated with a steady state ripple. In this manner, dVdroop/dt does not impact steady state control loop, keeping small signal properties of the example voltage regulator 100 intact. The comparison of the example Vn 312 to the output of the differentiator amplifier 308 allows the example amplifier 310 to output a voltage (e.g., the example amplifier output voltage 314) during transient, decreasing the undershoot of the Vcore 146 of FIG. 1. The example amplifier output voltage 314 is dVdroop/dt during transient state and zero during steady state. The example summer 207 adds the example amplifier output voltage 314 to the example Vramp 106 to increase the slope of Vramp 106 during transient state by outputting the example adjusted Vramp 209. Alternatively, the example differentiator 206 may include a current source controlled by the example amplifier output voltage 314. In such examples, the summer 207 may combine a current output by the current source of the differentiator 206 (e.g., corresponding to the example amplifier output voltage) and the current output by the example Vramp generator 302 and output the example adjusted Vramp 209 based on the comparison of the two currents.

Figure 4:
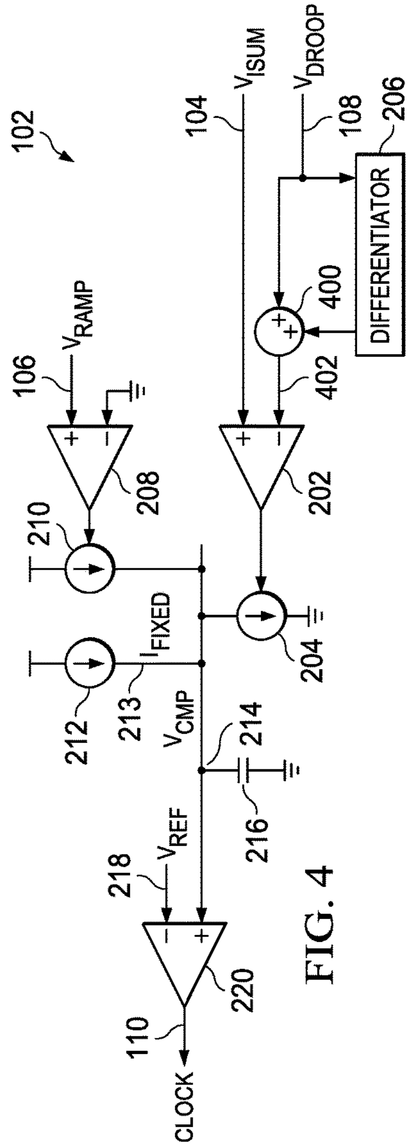
FIG. 4 is an alternative block diagram of the example modulator of FIG. 1.

FIG. 4 is a block diagram of an alternative implementation of the modulator 102 of FIG. 1, disclosed herein, to improve the transient response of the example voltage regulator 100 of FIG. 1 by increasing the example Vdroop 108 during transient state. While the example modulator 102 is described in conjunction with the example voltage regulator 100 of FIG. 1, the example modulator 102 may be utilized to improve the transient response of any type of voltage regulator. The example modulator 102 includes the example Visum 104, the example Vramp 106, the example Vdroop 108, and the example clock 110 of FIG. 1. The example modulator 102 further includes the example differential amplifier 202, the example differential amplifier output current source 204, the example differentiator 206, the example amplifier 208, the example ramp current source 210, the example Ifixed current source 212, the example Ifixed 213, the example Vcmp 214, the example capacitor 216, the example Vref 218, and the example comparator 220 of FIG. 2. The example modulator 102 further includes an example summer 400 and an example adjusted Vdroop 402.

As described above, in order to increase the duty cycle of the example clock 110, the example Vcmp 214 may be increased so that it will reach the example Vref 218 faster to generate the pulse of the example clock 110. The example modulator 102 of FIG. 4 increases the example Vdroop 108 during transient state which decreases the differential amplifier output causes the current generated by the differential amplifier output current source 204 to decrease and increases the voltage of example Vcmp 214.

The example Vdroop 108 of FIG. 4 is entered into the example summer 400 and the example differentiator 206. The example differentiator 206 may be the example differentiator 206 of FIG. 2 or 3. However, the example differentiator 206 of FIG. 4 outputs dVdroop/dt to increase the example Vdroop 108, whereas the example differentiator 206 of FIGS. 2 and 3 outputs Vdroop/dt to increase the example Vramp 106. As described in conjunction with FIG. 2, the output of the differentiator 206 is dVdroop/dt (e.g., the slope of Vdroop) during transient state and is zero during steady state. The example summer 400 sums the example Vdroop 108 with dVdroop/dt to generate the example adjusted Vdroop 402. During steady state, because the output of the differentiator 206 is zero, the example adjusted Vdroop 402 is the same voltage as the example Vdroop 108. During transient state, because the output of the differentiator 206 is dVdroop/dt (e.g., a positive voltage), the adjusted Vdroop 402 is a voltage higher than the example Vdroop 108. Because the adjusted Vdroop 402 is higher than the example Vdroop 108 during transient state, the output of the example differential amplifier 202 is decreased. Decreasing the output of the example differential amplifier 202 decreases the example differential amplifier output current (e.g., generated by the example differential amplifier output current source 204 based on the output of the differential amplifier 202) drawn away from the example Vcmp 214. Decreasing the example differential amplifier output current increases the example Vcmp 214 allowing the example Vcmp 214 to more quickly reach the example Vref 218 which increases the duty cycle of the example clock 110.

Figure 5:
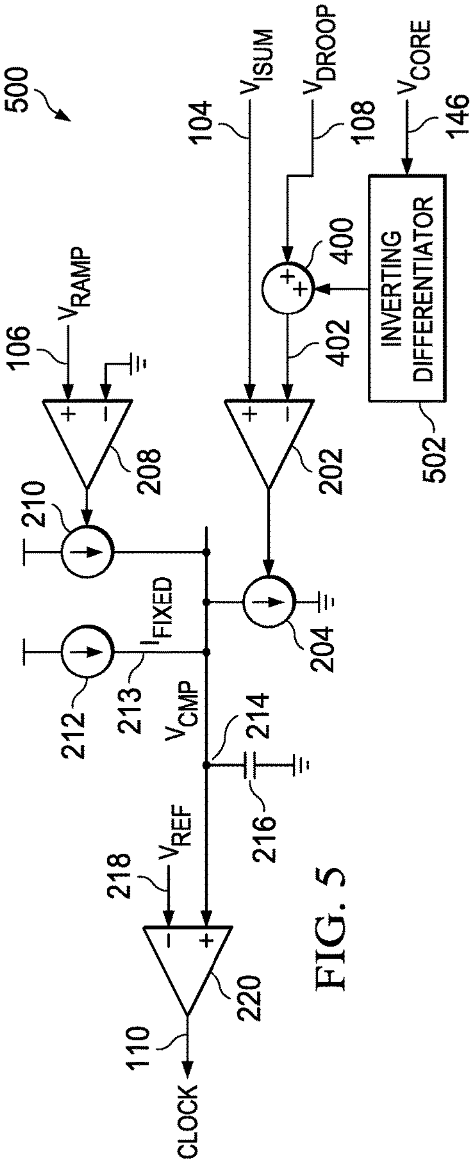
FIG. 5 is an alternative implementation of the example modulator of FIG. 1.

FIG. 5 is a block diagram of an alternative implementation of an example modulator 500, disclosed herein, to improve the transient response of the example voltage regulator 100 of FIG. 1 by increasing the example Vdroop 108 during transient state. In the illustrated example, the example modulator 500 replaces the example modulator 102 of FIG. 1. Additionally, the example modulator 500 receives the example Vcore 146 of FIG. 1 as an additional input. While the example modulator 500 is described in conjunction with the example voltage regulator 100 of FIG. 1, the example modulator 500 may be utilized to improve the transient response of any type of voltage regulator. The example modulator 500 includes the example Visum 104, the example Vramp 106, the example Vdroop 108, the example clock 110, and the example Vcore 146 of FIG. 1. The example modulator 500 further includes the example differential amplifier 202, the example differential amplifier output current source 204, the example amplifier 208, the example ramp current source 210, the example Ifixed current source 212, the example Ifixed 213, the example Vcmp 214, the example capacitor 216, the example Vref 218, and the example comparator 220 of FIG. 2. The example modulator 500 further includes the example summer 400 and the example adjusted Vdroop 402 of FIG. 4. The example modulator 500 further includes an example inverting differentiator 502.

As described above, in order to increase the duty cycle of the example clock 110, the example Vcmp 214 may be increased so that it will reach the example Vref 218 faster to generate the pulse of the example clock 110. The example modulator 500 of FIG. 5 increases the example Vdroop 108 during transient state which decreases the differential amplifier output causes the current generated by the differential amplifier output current source 204 to decrease and increases the voltage of example Vcmp 214.

The example Vdroop 108 of FIG. 5 is entered into the example summer 400 and the example Vcore 146 is entered into the example inverting differentiator 502. The example inverting differentiator 502 is similar to the example differentiator 206 of FIG. 2 or 3. However, the example inverting differentiator 502 of FIG. 5 outputs an inverted derivative of the input (E.g., Vcore 146), whereas the example differentiator 206 of FIGS. 2 and 3 outputs the derivative (e.g., non-inverted). The example Vcore 146 corresponds to an inversion of the example Vdroop. Thus, calculating the inverted derivative of the example Vcore 146 is substantially equivalent to calculating the non-inverted derivative of the example Vdroop 108. The output of the inverting differentiator 502 is the inversion of dVcore/dt (e.g., the slope of Vcore) during transient state and is zero during steady state. In some examples, the inverting differentiator 502 includes a filter to filter out any noise associated with the example Vcore 146.

The example summer 400 of FIG. 5 sums the example Vdroop 108 with inverted dVcore/dt to generate the example adjusted Vdroop 402. During steady state, because the output of the inverting differentiator 502 is zero, the example adjusted Vdroop 402 is the same voltage as the example Vdroop 108. During transient state, because the output of the inverting differentiator 502 is the inverted dVcore/dt (e.g., a positive voltage), the adjusted Vdroop 402 is a voltage higher than the example Vdroop 108. Because the adjusted Vdroop 402 is higher than the example Vdroop 108 during transient state, the output of the example differential amplifier 202 is decreased. Decreasing the output of the example differential amplifier 202 decreases the example differential amplifier output current (e.g., generated by the example differential amplifier output current source 204 based on the output of the differential amplifier 202) drawn away from the example Vcmp 214. Decreasing the example differential amplifier output current increases the example Vcmp 214 allowing the example Vcmp 214 to more quickly reach the example Vref 218 which increases the duty cycle of the example clock 110.

Figure 6:
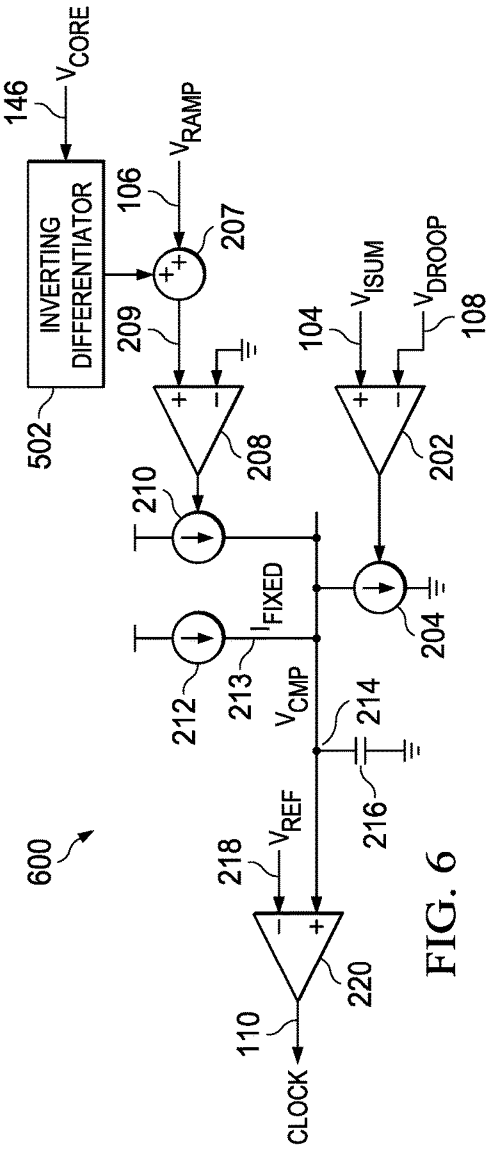
FIG. 6 is an alternative implementation of the example modulator of FIG. 1.

FIG. 6 is a block diagram of an alternative implementation of an example modulator 600, disclosed herein, to improve the transient response of the example voltage regulator 100 of FIG. 1 by increasing the example Vramp 106 during transient state by generating the example adjusted Vramp 209. In the illustrated example, the example modulator 600 replaces the example modulator 102 of FIG. 1. Additionally, the example modulator 600 receives the example Vcore 146 of FIG. 1 as an additional input. While the example modulator 600 is described in conjunction with the example voltage regulator 100 of FIG. 1, the example modulator 600 may be utilized to improve the transient response of any type of voltage regulator. The example modulator 600 includes the example Visum 104, the example Vramp 106, the example Vdroop 108, the example clock 110, and the example Vcore 146 of FIG. 1. The example modulator 600 further includes the example differential amplifier 202, the example differential amplifier output current source 204, the example summer 207, the example amplifier 208, the example adjusted Vramp 106, the example ramp current source 210, the example Ifixed current source 212, the example Ifixed 213, the example Vcmp 214, the example capacitor 216, the example Vref 218, and the example comparator 220 of FIG. 2. The example modulator 600 further includes the example inverting differentiator 502 of FIG. 5.

As described above, in order to increase the duty cycle of the example clock 110, the example Vcmp 214 may be increased so that it will reach the example Vref 218 faster to generate the pulse of the example clock 110. The example modulator 600 of FIG. 6 increases the example Vramp 106 (e.g., by generating the example adjusted Vramp 207) during transient state which increases the voltage of example Vcmp 214.

The example Vcore 146 of FIG. 6 is entered into the example inverting differentiator 502. The example inverting differentiator 502 is similar to the example differentiator 206 of FIG. 2 or 3. However, the example inverting differentiator 502 of FIG. 6 outputs an inverted derivative of the input (E.g., Vcore 146), whereas the example differentiator 206 of FIGS. 2 and 3 outputs the derivative (e.g., non-inverted). The example Vcore 146 corresponds to an inversion of the example Vdroop. Thus, calculating the inverted derivative of the example Vcore 146 is substantially equivalent to calculating the non-inverted derivative of the example Vdroop 108. The output of the inverting differentiator 502 is the inversion of dVcore/dt (e.g., the slope of Vcore) during transient state and is zero during steady state. In some examples, the inverting differentiator 502 includes a filter to filter out any noise associated with the example Vcore 146.

The example summer 207 of FIG. 6 sums the example Vramp 106 with inverted dVcore/dt to generate the example adjusted Vramp 209. During steady state, because the output of the inverting differentiator 502 is zero, the example adjusted Vramp 209 is the same voltage as the example Vramp 106. During transient state, because the output of the inverting differentiator 502 is the inverted dVcore/dt (e.g., a positive voltage), the adjusted Vramp 209 is a voltage higher than the example Vramp 106. Because the adjusted Vramp 209 is higher than the example Vramp 106 during transient state, the output of the example amplifier 208 is increased. Increasing the output of the example amplifier 208 increases the current output by the example amplifier output current source 210, thereby increases the example Vcmp 214 allowing the example Vcmp 214 to more quickly reach the example Vref 218 which increases the duty cycle of the example clock 110.

While example manners of implementing the example modulator 102 of FIG. 1 is illustrated in FIGS. 2-4, the example modulator 500 is illustrated in FIG. 5, and the example modulator 600 is illustrated in FIG. 6, elements, processes and/or devices illustrated in FIGS. 2-6 may be combined, divided, re-arranged, omitted, eliminated and/or implemented in any other way. Further, the example differential amplifier 202, the example current source 204, the example differentiator 206, the example summer 207, the example amplifier 208, the example current source 210, the example current source 212, the example comparator 220, the example summer 400, the example inverting differentiator 502, and/or, more generally, the example modulator 102 of FIGS. 2-4, the example modulator 500 of FIG. 5, and/or the example modulator 600 of FIG. 6, may be implemented by hardware, machine readable instructions, software, firmware and/or any combination of hardware, machine readable instructions, software and/or firmware. Thus, for example, any of the example differential amplifier 202, the example current source 204, the example differentiator 206, the example summer 207, the example amplifier 208, the example current source 210, the example current source 212, the example comparator 220, the example summer 400, the example inverting differentiator 502, and/or, more generally, the example modulator 102 of FIGS. 2-4, the example modulator 500 of FIG. 5, and/or the example modulator 600 of FIG. 6 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example differential amplifier 202, the example current source 204, the example differentiator 206, the example summer 207, the example amplifier 208, the example current source 210, the example current source 212, the example comparator 220, the example summer 400, the example inverting differentiator 502, and/or, more generally, the example modulator 102 of FIGS. 2-4, the example modulator 500 of FIG. 5, and/or the example modulator 600 of FIG. 6, is/are hereby expressly defined to include a tangible computer readable storage device or storage disk such as a memory, a digital versatile disk (DVD), a compact disk (CD), a Blu-ray disk, etc. storing the software and/or firmware. Further still, the example modulator 102 of FIGS. 2-4, the example modulator 500 is illustrated in FIG. 5, and/or the example modulator 600 of FIG. 6 includes elements, processes and/or devices in addition to, or instead of, those illustrated in FIGS. 7-10, and/or may include more than one of any or all of the illustrated elements, processes and devices.

Figure 7:
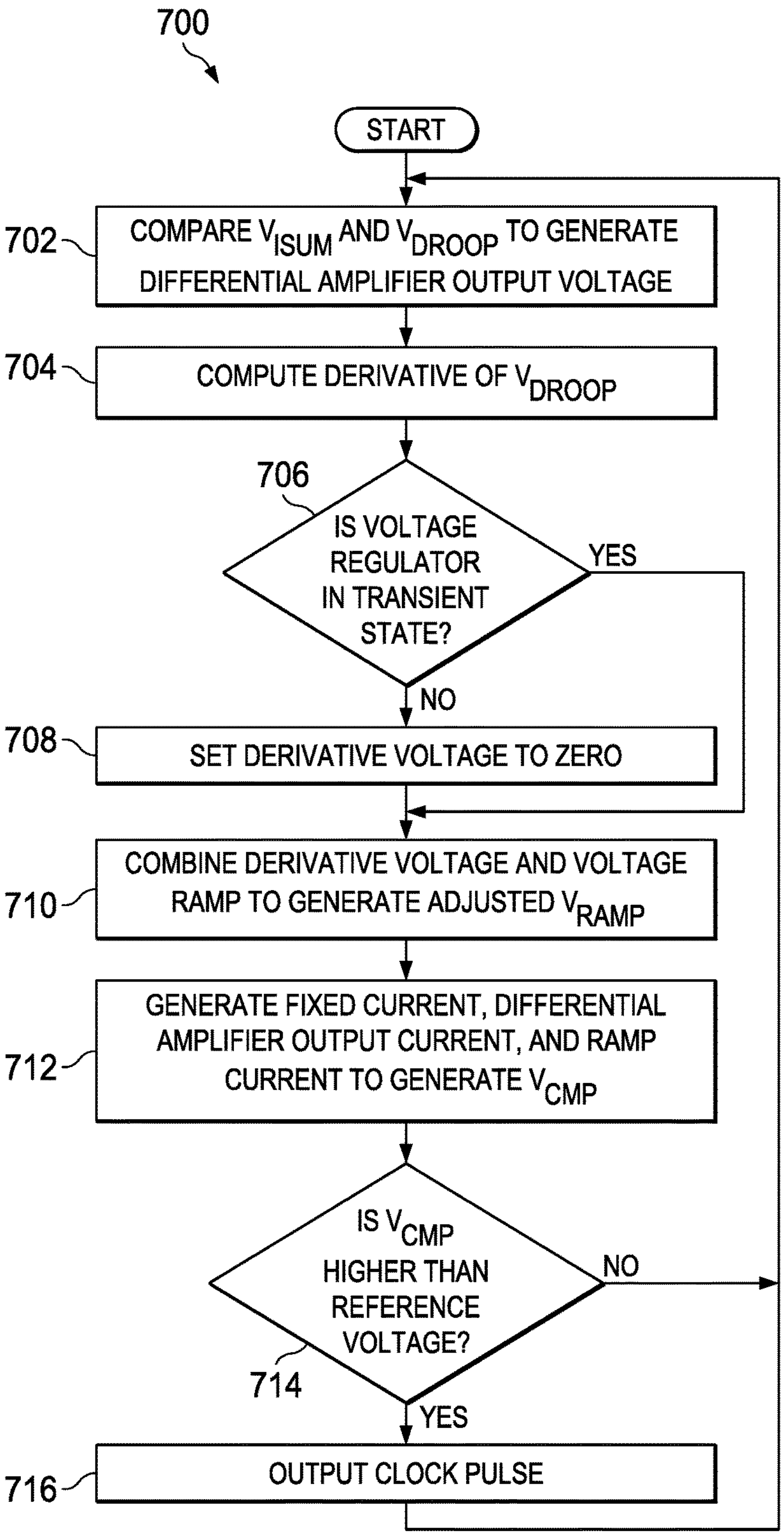
FIG. 7 is a flowchart representative of example machine readable instructions that may be executed to implement the example modulator of FIGS. 2 and 3 to output an example clock signal of FIGS. 1, 2, and 3.
Figure 8:
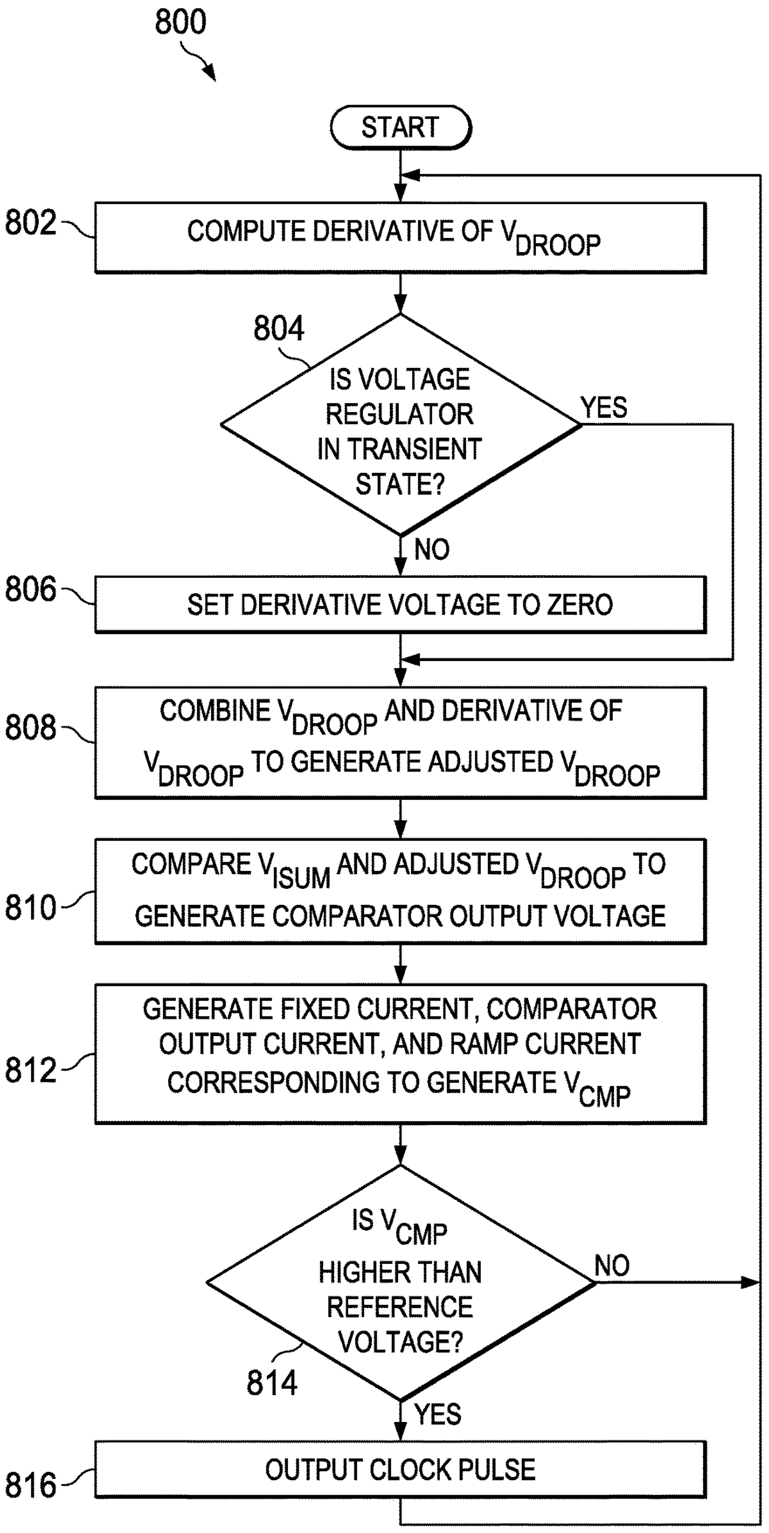
FIG. 8 is a flowchart representative of example machine readable instructions that may be executed to implement the example modulator of FIG. 4 to output an example clock signal of FIGS. 1 and 4.
Figure 9:
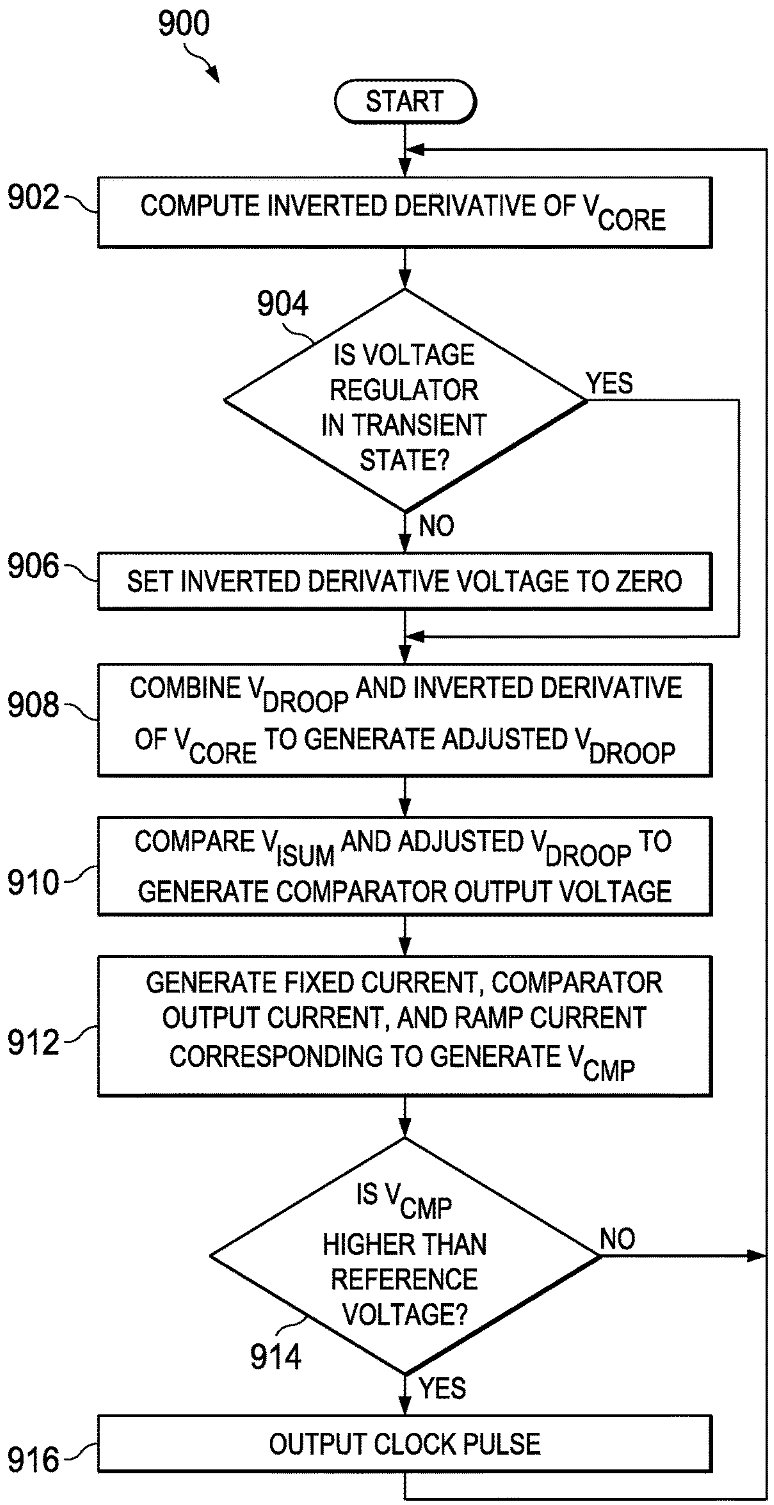
FIG. 9 is a flowchart representative of example machine readable instructions that may be executed to implement the example modulator of FIG. 5 to output an example clock signal of FIGS. 1 and 5.
Figure 10:
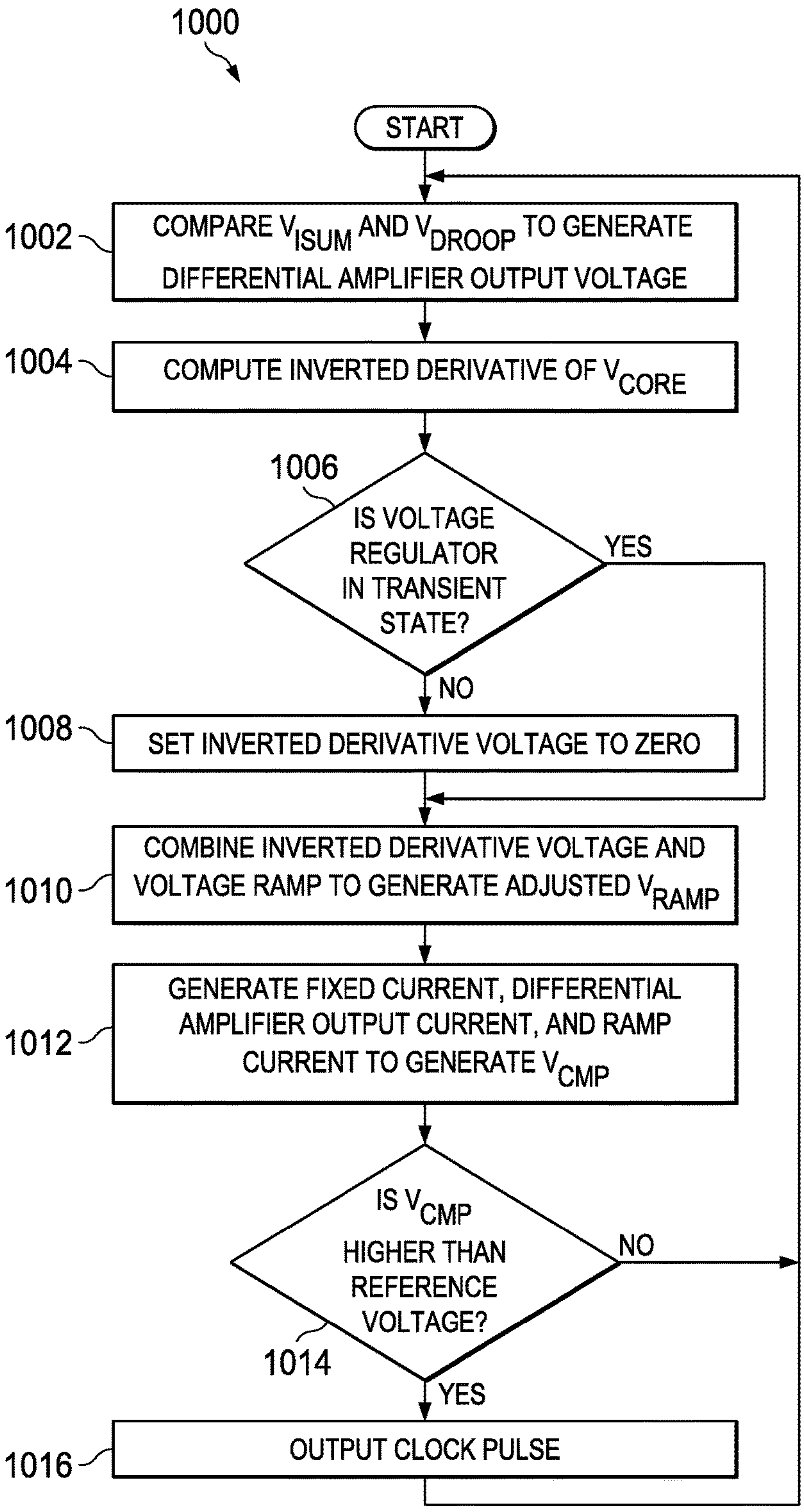
FIG. 10 is a flowchart representative of example machine readable instructions that may be executed to implement the example modulator of FIG. 6 to output an example clock signal of FIGS. 1 and 6.

A flowchart representative of example machine readable instructions for implementing the example modulator 102 of FIGS. 2 and 3 are shown in FIG. 7, the example modulator 102 of FIG. 4 is shown in FIG. 8, the example modulator 500 of FIG. 5 is shown in FIG. 9, the example modulator 600 of FIG. 6 is shown in FIG. 10. In the examples, the machine readable instructions comprise a program for execution by a processor such as the processor 1312 shown in the example processor platform 1300 discussed below in connection with FIG. 13. The program may be embodied in machine readable instructions stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIGS. 7-10, many other methods of implementing the example modulator 102 of FIGS. 2-4, the example modulator 500 of FIG. 5, and/or the example modulator 600 of FIG. 6 may alternatively be used. For example, the order of execution of the blocks may be changed, and/or some of the blocks described may be changed, eliminated, or combined.

As mentioned above, the example process of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIGS. 7-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is an example flowchart 700 representative of example machine readable instructions that may be executed by the example modulator 102 of FIGS. 2 and 3 to improve the transient response of the example voltage regulator 100 of FIG. 1. Although the instructions of FIG. 7 are described in conjunction with the example modulator 102 of FIGS. 2 and 3, the example instructions may be utilized by any type of modulator.

At block 702, the example differential amplifier 202 compares the example Visum 104 and the example Vdroop 108 to generate the differential amplifier output voltage. As described above in conjunction with FIG. 2, the example differential amplifier output voltage controls the example differential amplifier output current source 204 to generate a current that affects the voltage of the example Vcmp 214 (e.g., when the current is positive, the voltage of Vcmp 214 is decreased and when the current is negative, the voltage of Vcmp 214 is increased).

At block 704, the example differentiator 206 of FIGS. 2 and 3 computes the derivative of the example Vdroop 108. At block 706, the example differentiator 206 determines if the voltage regulator 100 of FIG. 1 is in transient state. In some examples, steady state ripples may cause the differentiator 206 to add unnecessary voltage to the example Vdroop 108 in a steady state. Thus, the differentiator 206 may block such steady state ripples based on the determination, as described above in conjunction with FIG. 3. If the example differentiator 206 determines that the example voltage regulator 100 is not in transient state (e.g., the voltage regulator 100 is in steady state), the differentiator 206 blocks the dVdroop/dt voltage by setting the voltage to zero (block 708). If the differentiator 206 determines that the example voltage regulator 100 is in transient state, the process continues to block 710.

At block 710, the example summer 207 of FIGS. 2 and 3 combines the derivative voltage (e.g., dVdroop/dt) and the example Vramp 106 to generate the example adjusted Vramp 209, increasing the rate of the example Vramp 106. In some examples, the example adjusted Vramp 209 is amplified by an amplifier (e.g., the example amplifier 208 of FIGS. 2 and 3). At block 712, the example Ifixed current source 212 generates the example Ifixed current 213, the differential amplifier output current source 204 generates a differential amplifier current (e.g., based on the differential amplifier output voltage), and the example ramp current source 210 generates a ramp current (e.g., based on the adjusted ramp voltage) to generate the example Vcmp 214.

At block 714, the example comparator 220 of FIGS. 2 and 3 compares the example Vcmp 214 to the example Vref 218 to determine if the Vcmp 214 is greater than the example Vref 218. If the example comparator 220 determines that the Vcmp 214 is greater than the example Vref 218, then the example comparator 220 outputs a clock pulse (block 716). As described above, when the example clock 110 is pulsed, the example Vramp 106 discharges and the process is repeated. If the example comparator 220 determines that the example Vcmp 214 is not greater than the example Vref 218, then the process is repeated while the example Vramp 106 increases until the example Vcmp 214 is greater than the example Vref.

FIG. 8 is an example flowchart 800 representative of example machine readable instructions that may be executed by the example modulator 102 of FIG. 4 to improve the transient response of the example voltage regulator 100 of FIG. 1. Although the instructions of FIG. 8 are described in conjunction with the example modulator 102 of FIG. 4, the example instructions may be utilized by any type of modulator.

At block 802, the example differentiator 206 of FIG. 4 computes the derivative of the example Vdroop 108. At block 804, the example differentiator 206 determines if the voltage regulator 100 of FIG. 1 is in transient state. In some examples, steady state ripples may cause the differentiator 206 to add unnecessary voltage to the example Vdroop 108 in a steady state. Thus, the differentiator 206 may block such steady state ripples based on the determination. If the example differentiator 206 determines that the example voltage regulator 100 is not in transient state (e.g., the voltage regulator 100 is in steady state), the differentiator 206 blocks the dVdroop/dt voltage by setting the voltage to zero (block 806). If the differentiator 206 determines that the example voltage regulator 100 is in transient state, the process continues to block 808.

At block 808, the example summer 400 of FIG. 4 combines the derivative voltage (e.g., dVdroop/dt) and the example Vdroop 108 to increase the rate of the example Vdroop 108 by generating the example adjusted Vdroop 402. At block 810, the example differential amplifier 202 compares the example Visum 104 and the example adjusted Vdroop 402 to generate a differential amplifier output voltage. The differential amplifier output voltage controls the example differential amplifier output current source 202 to generate a differential amplifier output current. At block 812, the example Ifixed current source 212 generates the example Ifixed current 213, the differential amplifier output current source 204 generates a differential amplifier current (e.g., based on the differential amplifier output voltage), and the example ramp current source 210 generates a ramp current (e.g., based on the ramp voltage) to generate the example Vcmp 214.

At block 814, the example comparator 220 of FIG. 4 compares the voltage at the example Vcmp 214 to the example Vref 218 to determine if the Vcmp 214 voltage is greater than the example Vref 218. If the example comparator 220 determines that the Vcmp 214 voltage is greater than the example Vref 218, then the example comparator 220 outputs a clock pulse (block 816). As described above, when the example clock 110 is pulsed, the example Vramp 106 discharges and the process is repeated. If the example comparator 220 determines that the example Vcmp 214 voltage is not greater than the example Vref 218, then the process is repeated while the example Vramp 106 increases until the example Vcmp 214 is greater than the example Vref.

FIG. 9 is an example flowchart 900 representative of example machine readable instructions that may be executed by the example modulator 500 of FIG. 5 to improve the transient response of the example voltage regulator 100 of FIG. 1. Although the instructions of FIG. 9 are described in conjunction with the example modulator 500 of FIG. 5, the example instructions may be utilized by any type of modulator.

At block 902, the example inverting differentiator 502 of FIG. 5 computes the inverted derivative of the example Vcore 146. In some examples, the inverting differentiator 502 may filter the example Vcore 146 to remove any irregularities. At block 904, the example inverting differentiator 502 determines if the voltage regulator 100 of FIG. 1 is in transient state. In some examples, steady state ripples may cause the inverting differentiator 502 to add unnecessary voltage to the example Vcore 146 in a steady state. Thus, the inverting differentiator 502 may block such steady state ripples based on the determination. If the example inverting differentiator 502 determines that the example voltage regulator 100 is not in transient state (e.g., the voltage regulator 100 is in steady state), the inverting differentiator 502 blocks the inverted dVcore/dt voltage by setting the voltage to zero (block 906). If the inverting differentiator 502 determines that the example voltage regulator 100 is in transient state, the process continues to block 908.

At block 908, the example summer 400 of FIG. 5 combines the inverted derivative voltage (e.g., inverted dVcore/dt) and the example Vdroop 108 to increase the rate of the example Vdroop 108 by generating the example adjusted Vdroop 402. At block 910, the example differential amplifier 202 compares the example Visum 104 and the example adjusted Vdroop 402 to generate a differential amplifier output voltage. The differential amplifier output voltage controls the example differential amplifier output current source 202 to generate a differential amplifier output current. At block 912, the example Ifixed current source 212 generates the example Ifixed current 213, the differential amplifier output current source 204 generates a differential amplifier current (e.g., based on the differential amplifier output voltage), and the example ramp current source 210 generates a ramp current (e.g., based on the ramp voltage) to generate the example Vcmp 214.

At block 914, the example comparator 220 of FIG. 5 compares the voltage at the example Vcmp 214 to the example Vref 218 to determine if the Vcmp 214 voltage is greater than the example Vref 218. If the example comparator 220 determines that the Vcmp 214 voltage is greater than the example Vref 218, then the example comparator 220 outputs a clock pulse (block 916). As described above, when the example clock 110 is pulsed, the example Vramp 106 discharges and the process is repeated. If the example comparator 220 determines that the example Vcmp 214 voltage is not greater than the example Vref 218, then the process is repeated while the example Vramp 106 increases until the example Vcmp 214 is greater than the example Vref.

FIG. 10 is an example flowchart 1000 representative of example machine readable instructions that may be executed by the example modulator 600 of FIG. 6 to improve the transient response of the example voltage regulator 100 of FIG. 1. Although the instructions of FIG. 10 are described in conjunction with the example modulator 600 of FIG. 6, the example instructions may be utilized by any type of modulator.

At block 1002, the example differential amplifier 202 of FIG. 6 compares the example Visum 104 and the example Vdroop 108 to generate the differential amplifier output voltage. The example differential amplifier output voltage controls the example differential amplifier output current source 204 to generate a current that affects the voltage of the example Vcmp 214 (e.g., when the current is positive, the voltage of Vcmp 214 is decreased and when the current is negative, the voltage of Vcmp 214 is increased).

At block 1004, the example inverting differentiator 502 of FIG. 6 computes the inverted derivative of the example Vcore 146. At block 1006, the example inverted differentiator 502 determines if the voltage regulator 100 of FIG. 1 is in transient state. In some examples, steady state ripples may cause the inverting differentiator 502 to add unnecessary voltage to the example Vramp 106 in a steady state. Thus, the inverting differentiator 502 may block such steady state ripples based on the determination. If the example inverting differentiator 502 determines that the example voltage regulator 100 is not in transient state (e.g., the voltage regulator 100 is in steady state), the inverting differentiator 502 blocks the inverted dVdroop/dt voltage by setting the voltage to zero (block 1008). If the inverting differentiator 502 determines that the example voltage regulator 100 is in transient state, the process continues to block 1010.

At block 1010, the example summer 207 of FIG. 6 combines the inverted derivative voltage (e.g., inverted dVcore/dt) and the example Vramp 106 to generate the example adjusted Vramp 209, increasing the rate of the example Vramp 106. In some examples, the example adjusted Vramp 209 is amplified by an amplifier (e.g., the example amplifier 208 of FIG. 6). At block 1012, the example Ifixed current source 212 generates the example Ifixed current 213, the differential amplifier output current source 204 generates a differential amplifier current (e.g., based on the differential amplifier output voltage), and the example ramp current source 210 generates a ramp current (e.g., based on the adjusted ramp voltage) to generate the example Vcmp 214.

At block 1014, the example comparator 220 of FIG. 6 compares the example Vcmp 214 to the example Vref 218 to determine if the Vcmp 214 is greater than the example Vref 218. If the example comparator 220 determines that the Vcmp 214 is greater than the example Vref 218, then the example comparator 220 outputs a clock pulse (block 1016). As described above, when the example clock 110 is pulsed, the example Vramp 106 discharges and the process is repeated. If the example comparator 220 determines that the example Vcmp 214 is not greater than the example Vref 218, then the process is repeated while the example Vramp 106 increases until the example Vcmp 214 is greater than the example Vref.

Figure 11:
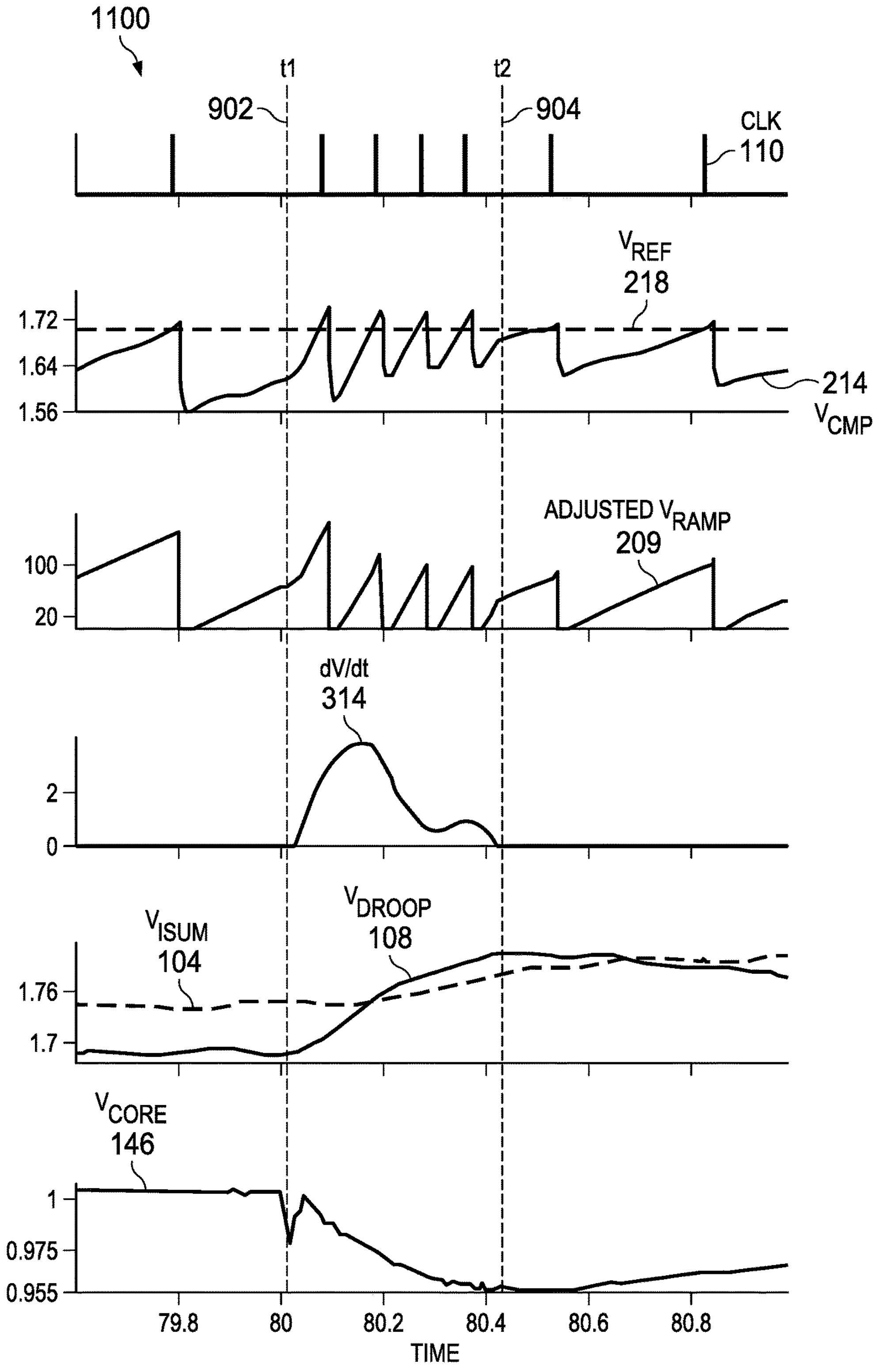
FIG. 11 includes graphs illustrating example signals of the example modulator of FIGS. 2 and 3.

FIG. 11 is an example graph 1100 illustrating a transient response using the example voltage regulator 100 of FIG. 1 and the example modulator 102 of FIGS. 2 and 3. The example graph includes the example Visum 104, the example Vdroop 108, the example clock 110, the example Vcore 146, the adjusted Vramp 209, the example Vcmp voltage 214, and the example Vref 218 of FIG. 2 and the example dVdroop/dt 314 of FIG. 3 (e.g., the output of the example differentiator 206 of FIG. 2). The example graph 1100 further includes an example first time (t1) 1102 and an example second time (t2) 1104.

Before the example t1 1102 of FIG. 11, the example voltage regulator 100 is operating at steady state. Because of the steady state conditions, the example Visum 104, the example Vdroop 108, and the example Vcore 146 are substantially steady. Because the example Vdroop 108 is substantially steady (e.g., the slope of Vdroop 108 is nearly zero), the example dVdroop/dt 314 is zero. As described above in conjunction with FIG. 3, an amplifier (e.g., the example amplifier 310) may be used to block out any steady state ripples of the example voltage regulator 100 (FIG. 1). Additionally, before the example t1 1102, the example adjusted Vramp 209 increases at a first rate (e.g., steady state rate). As described above, the example Vcmp 214 corresponds to the difference between (A) the summation of (i) the example Ifixed 213 of FIG. 2 and (ii) a ramp current (e.g., output by the example ramp current source 210) corresponding to example adjusted Vramp 209 and (B) a differential amplifier output current (e.g., output by the example differential amplifier output current source 204) of FIG. 2 (e.g., the difference between the example Visum 104 and the example Vdroop 108). When the example Vcmp 214 becomes greater than the example Vref 218, the example clock 110 pulses. As described above, the pulse cause the example adjusted Vramp 209 to quickly decrease causing the example Vcmp 214 to likewise decrease.

At the example t1 1102 of FIG. 11, the example voltage regulator 100 enters into transient state causing the example Vcore 146 to decrease and the example Vdroop 108 (which corresponds to the example Vcore 146) to increase. The increase of the example Vdroop 108 causes the example dVdroop/dt 314 to rapidly increase. Because the example dVdroop/dt 314 is added to the example adjusted Vramp 209, the slope (e.g., rate of change) of the example adjusted Vramp 209 increases to a second rate (e.g., transient rate), which causes the rising slope of the example Vcmp 214 voltage to likewise increase. The increased slope of the example Vcmp 214 voltage causes the example Vcmp 214 voltage to more quickly rise above the example Vref 218 causing pulses of the example clock 110 at a faster rate than steady state (e.g., before the example t1 1102), increasing the duty cycle.

At the example t2 1104 of FIG. 11, the example Vcore 146 and the example Vdroop 108 become substantially stable, causing the example voltage regulator 100 to enter back into steady state. Because the example Vdroop 108 is stable, the example dVdroop/dt 314 returns to zero causing the slope of the example adjusted Vramp 209 to return to the steady state rate. The slower steady state rate decreases the rate of the example Vcmp 214 voltage, causing the pulses to occur less frequently (e.g., slowing the duty cycle of the example voltage regulator 100).

Figure 12:
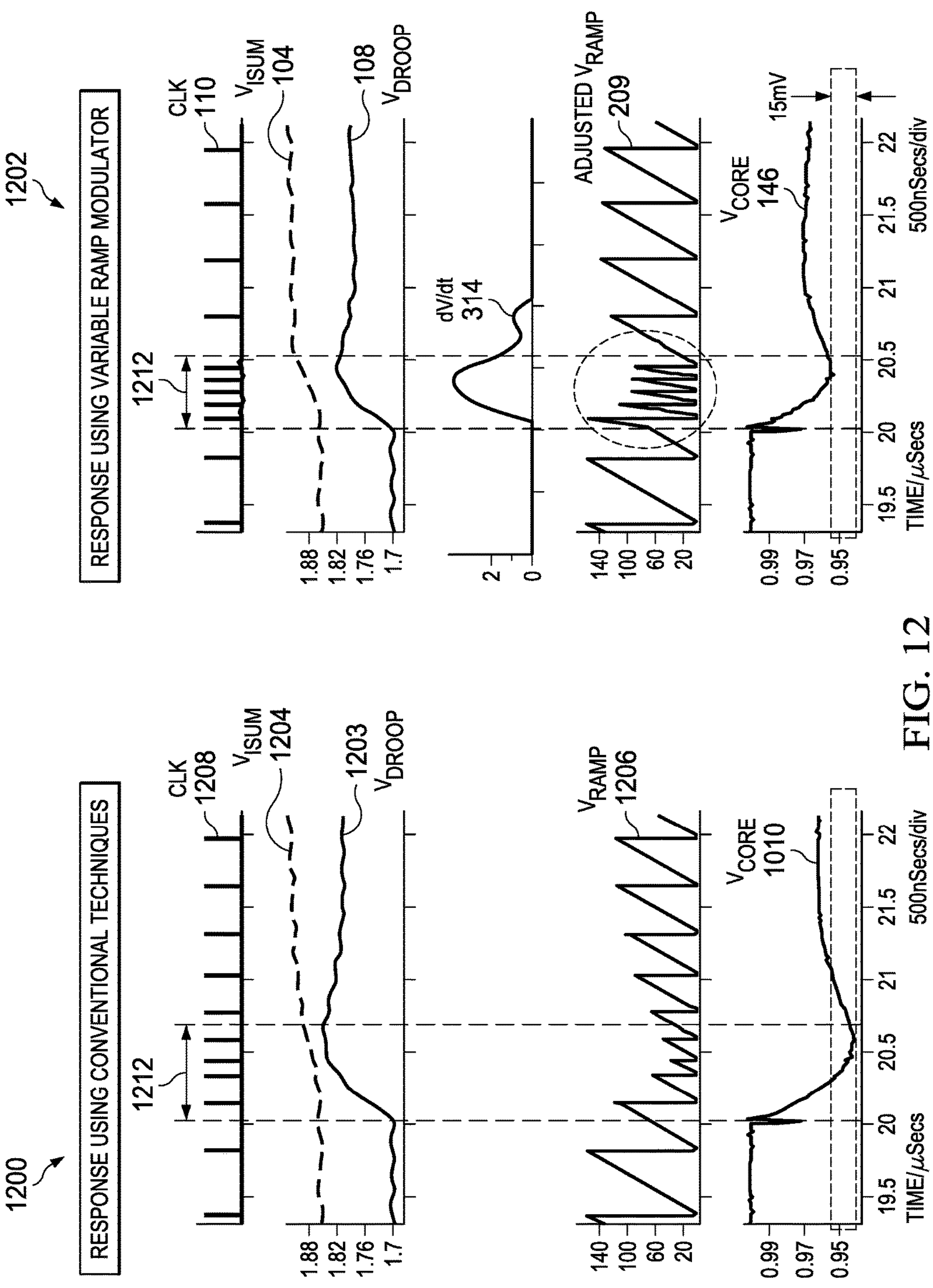
FIG. 12 includes graphs comparing an example response using conventional techniques with an example response of the example modulator of FIGS. 1, 2 and 3.

FIG. 12 illustrates a comparison of an example conventional response 1200 of a voltage regulator using conventional techniques (e.g., a fixed ramp modulator) and an example response 1202 of the example voltage regulator 100 of FIG. 1 using the variable ramp example modulator 102 of FIGS. 1, 2, and 3. The example conventional response 1200 includes an example conventional Vdroop 1203, an example conventional Visum 1204, an example conventional Vramp 1206, an example conventional clock 1208, and an example conventional Vcore 1210. The example variable ramp modulator response 1202 includes the example Visum 104, the example Vdroop 108, the example adjusted Vramp 209, and the example clock 110 of FIG. 2 and the example dVdroop/dt 314 of FIG. 3 (e.g., the output of the example differentiator 206 of FIG. 2). The example comparison of FIG. 12 includes an example transient state 1212.

As shown in the example comparison of FIG. 12, the example Vdroop 1203 and the example Vdroop 108 are the same and the example Visum 1204 and the example Visum 104 are the same. The example Vramp 1206 of the conventional response 1200 has a constant rate of increase, causing the example clock 1208 to slightly increase the frequency of pulses (e.g., duty cycle). However, the increased rate does not occur until about a third of the way through the example transient state 1212. In contrast, because the example dVdroop/dt 314 is added to the example Vdroop 108, the rate of the example adjusted Vramp 209 is increased significantly as soon as the transient state 1212 begins. Thus, the frequency of pulses of the example clock 110 significantly increases as soon as the example transient state 1212 begins. Increasing the frequency of the example clock 110 at the beginning of the example transient state 1212 improves the transient response by significantly decreasing the undershoot of the example Vcore 146 of FIG. 1. For example, as shown in the comparison of the example conventional Vcore 1210 and the example Vcore 146, the example Vcore 146 has a 15 millivolts (mV) less undershoot then the example conventional Vcore 1210 (e.g., the undershoot of the example conventional Vcore 1210 is 20 mV and the undershoot of the example Vcore 146 is 5 mV).

Figure 13:
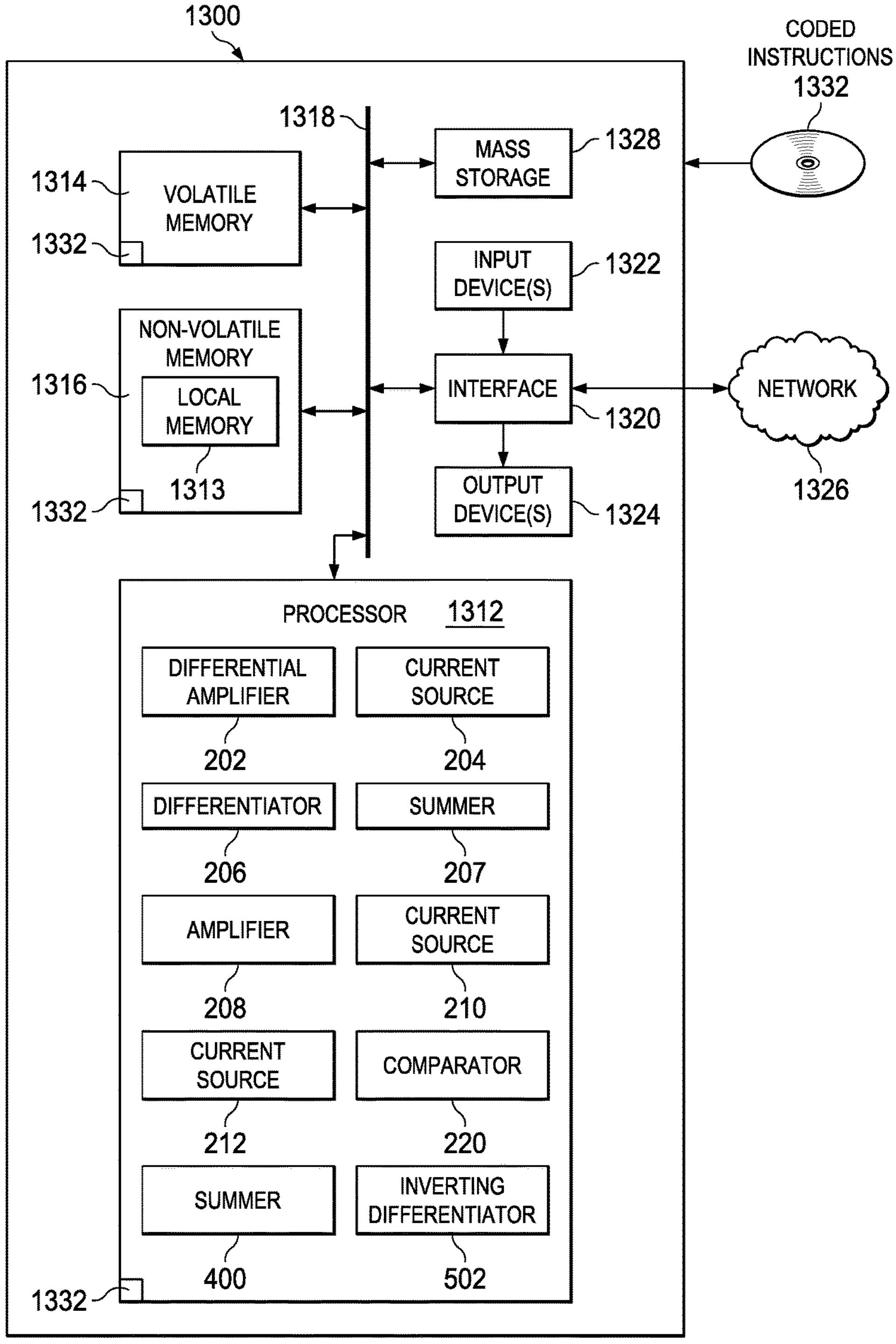
FIG. 13 is a block diagram of a processor platform structured to execute the example machine readable instructions of FIGS. 7-10 to control the example modulators of FIGS. 1-6.

FIG. 13 is a block diagram of an example processor platform 1300 capable of executing the instructions of FIGS. 7-10 to implement the example modulator 102 of FIGS. 1, 2, 3 and/or 4. The processor platform 1300 can be, for example, a server, a personal computer, a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by integrated circuits, logic circuits, microprocessors or controllers from any desired family or manufacturer.

The processor 1312 of the illustrated example includes a local memory 1313 (e.g., a cache). The example processor 1312 of FIG. 13 executes the instructions of FIGS. 7-10 to implement the example differential amplifier 202, the example current source 204, the example differentiator 206, the example summer 207, the example amplifier 208, the example current source 210, the example current source 212, the example comparator 220, the example summer 400, and/or the example inverting differentiator 502 of FIGS. 2-6 to implement the example modulator 102, the example modulator 500, and/or the example modulator 600. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a clock controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 7-10 may be stored in the mass storage device 1328, in the volatile memory 1314, in the non-volatile memory 1316, and/or on a removable tangible computer readable storage medium such as a CD or DVD.

From the foregoing, it would be appreciated that the above disclosed method, apparatus, and articles of manufacture improve a transient response of a multi-phase voltage regulator while reducing jitter. Examples disclosed herein compute the derivative of a droop voltage (corresponding to the output of the voltage regulator) to determine when transient state occurs. In some examples disclosed herein, the derivative of the droop voltage is added to a ramp voltage to increase the slope of the ramp voltage (e.g., generating a variable ramp voltage). As described herein, increasing the slope of the ramp voltage increases the duty cycle of the voltage regulator during transient state, which provides a faster, more efficient (e.g., less undershoot) transient response in the voltage regulator. In some examples disclosed herein, the derivative of the droop is added to the droop voltage to increase the duty cycle of the voltage regulator during transient state. Using the examples disclosed herein, undershoot and/or overshoot may be quickly detected and corrected accordingly by increasing the duty cycle. Additionally, examples disclosed herein eliminate the need of a threshold to detect undershoot, reducing the cost and complexity of a multiphase voltage regulator. Additionally, examples disclosed herein affect the transient state without affecting the steady state of the voltage regulator. Thus, example disclosed herein do not impact small signal properties of the voltage regulator and/or the COTCM control.

Some conventional techniques generate a fixed ramp voltage to reduce jitter. However, such conventional techniques have a slow transient response and have a large undershoot affecting the performance of the voltage regulator. Examples disclosed herein alleviate such problems by increasing voltages (e.g., the ramp voltage or the droop voltage) at transient state to increase the speed of the transient response and decrease the undershoot of the voltage regulator while still reducing jitter.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A modulator to improve a transient response of a multi-phase voltage regulator, the modulator comprising:

a differential amplifier to:

compare a first voltage to a droop voltage, the first voltage corresponding to a sum of inductor currents in the multi-phase voltage regulator, the droop voltage corresponding to an output voltage of the multi-phase voltage regulator; and output a first control voltage based on the comparison;

a differentiator to compute a derivative of the droop voltage, the derivative of the droop voltage being combined with a ramp voltage to generate a second control voltage; and a comparator to:

compare a reference voltage with a second voltage, the second voltage being a combination of the first control voltage and the second control voltage; and when the second voltage is greater than the reference voltage, output a voltage pulse.

2. The modulator of claim 1, further including a ramp generator coupled to the output of the comparator to generate the ramp voltage, wherein the voltage pulse decreases the ramp voltage.

3. The modulator of claim 2, further including an amplifier coupled to the ramp generator to amplify the adjusted ramp voltage.

4. The modulator of claim 3, wherein the comparator is coupled to (A) the output of the differential amplifier and (B) the output of the amplifier.

5. The modulator of claim 1, wherein, when the multi-phase voltage regulator is at steady state, the output of the differentiator is zero and the adjusted ramp voltage is substantially similar to the ramp voltage.

6. The modulator of claim 1, wherein increasing the ramp voltage increases a frequency of voltage pulses output by the comparator.

7. The modulator of claim 6, wherein the frequency of the voltage pulses output by the comparator correspond to a duty cycle of operation of the multi-phase voltage regulator.

8. The modulator of claim 1, wherein the voltage pulse is transmitted to at least one of a first phase or a second phase of the multi-phase voltage regulator.

9. The modulator of claim 1, wherein, when the multi-phase voltage regulator is at transient state, a first rate of increase of the ramp voltage is greater than a second rate of increase of the adjusted ramp voltage.

10. The modulator of claim 1, wherein the first control voltage corresponds to a difference between the first voltage and the droop voltage.

11. The modulator of claim 1, further including:

a first current source to receive the first control voltage and output a first current corresponding to the first control voltage; and a second current source to receive the second control voltage and output a second current corresponding to the second control voltage; and a third current source to output a fixed current, the second voltage corresponding to a combination of the first current, second current, and the fixed current.

12. A modulator to improve a transient response of a multi-phase voltage regulator, the modulator comprising:

a differentiator to compute a derivative of a droop voltage, the droop voltage corresponding to an output voltage of the multi-phase voltage regulator;

a summer to generate an adjusted droop voltage by combining the droop voltage with the derivative of the droop voltage;

a differential amplifier to:

compare a first voltage to the adjusted droop voltage, the first voltage corresponding to a sum of inductor currents in the multi-phase voltage regulator; and output a first control voltage based on the comparison; and a comparator to:

compare a reference voltage with a second voltage, the second voltage being a combination of the first control voltage and a second control voltage, the second control voltage corresponding to a ramp voltage; and when the second voltage is greater than the reference voltage, output a voltage pulse.

13. The modulator of claim 12, further including a ramp generator coupled to the output of the comparator to generate the ramp voltage, wherein the voltage pulse decreases the ramp voltage.

14. The modulator of claim 13, further including an amplifier coupled to the ramp generator to amplify the ramp voltage.

15. The modulator of claim 14, wherein the comparator is coupled to (A) the output of the differential amplifier and (B) the output of the amplifier.

16. The modulator of claim 12, wherein, when the multi-phase voltage regulator is at steady state, the output of the differentiator is zero and the adjusted droop voltage is substantially similar as the droop voltage.

17. The modulator of claim 12, wherein the voltage pulse is transmitted to at least one of a first phase or a second phase of the multi-phase voltage regulator.

18. The modulator of claim 12, wherein, when the multi-phase voltage regulator is at transient state, the adjusted droop voltage is greater than the droop voltage and the output of the differential amplifier decreases.

19. The modulator of claim 12, wherein decreasing the output of the differential amplifier increases the second voltage.

20. A modulator to improve a transient response of a multi-phase voltage regulator, the modulator comprising:

a differential amplifier to:

compare a first voltage to a droop voltage, the first voltage corresponding to a sum of inductor currents in the multi-phase voltage regulator, the droop voltage corresponding to an output voltage of the multi-phase voltage regulator; and output a first control voltage based on the comparison;

a first current source to receive the first control voltage and output a first current based on the first control voltage;

a ramp generator to generate a ramp voltage;

a differentiator coupled to the ramp generator to compute a derivative of the droop voltage;

a summer to combine the ramp voltage with the derivative of the droop voltage to generate a second control voltage;

a second current source to receive the second control voltage and output a second current based on the second control voltage;

an amplifier coupled to the differentiator to amplify the adjusted ramp voltage; and a comparator coupled to the differential amplifier and the amplifier to:

compare a reference voltage with a second voltage, the second voltage being a combination of the first control voltage and the second control voltage; and when the second voltage is greater than the first voltage, output a voltage pulse.

* * * * *